US009330087B2

(12) United States Patent
El-Sharqwi et al.

(10) Patent No.: US 9,330,087 B2
(45) Date of Patent: May 3, 2016

(54) WORD BREAKER FROM CROSS-LINGUAL PHRASE TABLE

(71) Applicant: MICROSOFT TECHNOLOGY LICENSING, LLC, Redmond, WA (US)

(72) Inventors: Mohamed Ahmed El-Sharqwi, Cairo (EG); Achraf Abdel-Moneim Tawfik Mahmoud Chalabi, Cairo (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 13/861,146

(22) Filed: Apr. 11, 2013

(65) Prior Publication Data
US 2014/0309986 A1 Oct. 16, 2014

(51) Int. Cl.
G06F 17/27 (2006.01)
G06F 17/28 (2006.01)
G06F 17/20 (2006.01)
G10L 21/00 (2013.01)
G10L 25/00 (2013.01)

(52) U.S. Cl.
CPC ........ *G06F 17/2755* (2013.01); *G06F 17/2818* (2013.01); *G06F 17/2827* (2013.01)

(58) Field of Classification Search
USPC ...................................................... 704/1–10
See application file for complete search history.

(56) References Cited

U.S. PATENT DOCUMENTS

| | | | | |
|---|---|---|---|---|
| 5,337,232 A * | 8/1994 | Sakai | ................... | G06F 17/2775 704/9 |
| 5,369,577 A * | 11/1994 | Kadashevich | ........ | G06F 17/274 704/9 |
| 5,475,587 A * | 12/1995 | Anick | ................... | G06F 17/274 704/4 |
| 5,835,888 A * | 11/1998 | Kanevsky et al. | ................ | 704/9 |
| 6,038,527 A | 3/2000 | Renz | | |
| 6,233,545 B1 * | 5/2001 | Datig | ..................... | G06N 3/004 704/2 |
| 8,423,350 B1 * | 4/2013 | Chandra | ........... | G06F 17/30613 435/5 |
| 2005/0251384 A1 | 11/2005 | Yang | | |
| 2007/0083359 A1 | 4/2007 | Bender | | |
| 2009/0043564 A1 * | 2/2009 | Hwang et al. | ..................... | 704/4 |
| 2009/0326916 A1 | 12/2009 | Gao et al. | | |
| 2010/0082333 A1 * | 4/2010 | Al-Shammari | ..... | G06F 17/2735 704/10 |
| 2010/0185685 A1 * | 7/2010 | Chew | ................ | G06F 17/30675 707/803 |
| 2011/0137635 A1 * | 6/2011 | Chalabi | ............... | G06F 17/2863 704/2 |

(Continued)

OTHER PUBLICATIONS

Moon, "Minimally supervised induction of morphology through bitexts", 2008, Thesis, University of Texas at Austin, pp. 1-71.*

(Continued)

*Primary Examiner* — Olujimi Adesanya
(74) *Attorney, Agent, or Firm* — Alin Corie; Cassandra T. Swain; Micky Minhas

(57) ABSTRACT

Automatically creating word breakers which segment words into morphemes is described, for example, to improve information retrieval, machine translation or speech systems. In embodiments a cross-lingual phrase table, comprising source language (such as Turkish) phrases and potential translations in a target language (such as English) with associated probabilities, is available. In various examples, blocks of source language phrases from the phrase table are created which have similar target language translations. In various examples, inference using the target language translations in a block enables stem and affix combinations to be found for source language words without the need for input from human-judges or prior knowledge of source language linguistic rules or a source language lexicon.

14 Claims, 5 Drawing Sheets

(56) References Cited

U.S. PATENT DOCUMENTS

2011/0320185 A1* 12/2011 Broshi ........................... 704/4
2012/0290299 A1* 11/2012 Basson ................. G10L 15/063
                                                         704/235
2012/0296633 A1* 11/2012 Chalabi ............... G06F 17/2818
                                                         704/4
2012/0316862 A1* 12/2012 Sultan et al. ....................... 704/4

OTHER PUBLICATIONS

Wicentowski "Multilingual Noise-Robust Supervised Morphological Analysis using the WordFrame Model", 2004, In Proceedings of the Workshop of the ACL Special Interest Group on Computational Phonology (SIGPHON), pp. 1-8.*
Rappoport and Tsahi Levent-Levi. 2006. Induction of cross-language af_x and letter sequence correspondence, 2006, In EACL Workshop on Cross-Language Knowledge Induction, pp. 17-24.*
Afify et al, "On the use of morphological analysis for dialectal Arabic speech recognition," 2007, in Proc. InterSpeech, 2007, pp. 1-4.*
Bernhard et al, "Unsupervised morphological segmentation based on segment predictability and word segments alignment", 2006, In Proceedings of the PASCAL Challenges Workshop on Unsupervised Segmentation of Words into Morphemes, Apr. 2006.*
Maosong, et al.,"Chinese Word Segmentation without Using Lexicon and Hand-crafted Training Data" In Proceedings of the 17th International Conference on Computational Linguistics, vol. 2, Aug. 10, 1998, 7 pages.
Sharma, et al.,""Blind" Speech Segmentation: Automatic Segmentation of Speech without Linguistic Knowledge", In Proceedings of in Fourth International Conference on Spoken Language, Oct. 3, 1996, 4 pages.
"Unicode Compliant Multilingual Word Breaker", Published on: Apr. 21, 2005, Available at: http://www.codeproject.com/Articles/10183/Unicode-compliant-multilingual-word-breaker 12 pages.
Chen, Aitao,"Chinese Word Segmentation using Minimal Linguistic Knowledge" In Proceedings of the second SIGHAN workshop on Chinese language processing—vol. 17, May 2003, 4 pages.
Wang, et al.,"Web Scale NLP: A Case Study on URL Word Breaking", In Proceedings of in Third ACM International Conference on Web Search and Data Mining, Feb. 4, 2010, 10 pages.
Brown, "Corpus-driven splitting of compound words" Carnegie Mellon University, 2002, Proc 9th International conference on theoretical and methodological issues in machine translations. 10 pages.
"International Search Report & Written Opinion for PCT Patent Application No. PCT/US2014/033242", Mailed Date: Feb. 4, 2015, 9 pages.
Yarowsky, et al., "Inducing Multilingual Text Analysis Tools via Robust Projection across Aligned Corpora", In Proceedings of the First International Conference on Human Language Technology Research, Mar. 18, 2001, 8 Pages.
Naradowsky, et al., "Unsupervised Bilingual Morpheme Segmentation and Alignment with Context-rich Hidden Semi-Markov Models", In Proceedings of the 49th Annual Meeting of the Association for Computational Linguistics: Human Language Technologies, Jun. 19, 2011, pp. 895-904.
Rogati, et al., "Unsupervised Learning of Arabic Stemming using a Parallel Corpus", In Proceedings of the 41st Annual Meeting on Association for Computational Linguistics, vol. 1, Jul. 7, 2003, 8 pages.
Synder, et al., "Cross-lingual Propagation for Morphological Analysis", In Proceedings of the 23rd National Conference on Artificial Intelligence, Jul. 13, 2008, 7 Pages.
"International Preliminary Report on Patentability Issued in PCT Patent Application No. PCT/US2014/033242", Mailed Date: Jun. 22, 2015, 8 Pages.

* cited by examiner

| | Phrase Table | | |
|---|---|---|---|
| source phrase | target option A/ probability | target option B/ probability | target option C/ probability |
| bir saatlik | an hourly 0.6702634 | a one hour 0.6348674 | one hour 0.6297368 |
| kapayıncaya | the blink 0.5299705 | blink 0.5147306 | blink of 0.506618 |
| | | | |
| | | | |
| | | | |
| | | | |

FIG. 2

WORD BREAKER FROM CROSS-LINGUAL PHRASE TABLE

BACKGROUND

A word breaker (also referred to as a morphological analyzer) is an automated system which receives words and outputs morphemes. For example, given a word a word breaker is able to identify combinations of one or more morphemes which may make up that word. A morpheme is the shortest grammatical unit in a language. An example of a word and its constituent morphemes is the word "feeling" which may comprise a single morpheme "feeling" in the case that the word is used as a noun, and which may comprise two morphemes "feel" and "ing" where the word is used as a verb.

Existing word breakers are often created through supervised learning where examples of words and their morphemes are annotated by human judges. This makes word breakers expensive and time consuming to produce especially for highly inflectional languages such as Turkish. Another option is to use lexical data and linguistic rules. However, lexical data and linguistic rules are often unavailable depending on the language involved.

Word breakers are extremely useful for many applications including but not limited to information retrieval, machine translation and speech processing. In particular, word breakers are useful when processing morphology-rich languages such as Finnish, German, Turkish and Arabic.

The embodiments described below are not limited to implementations which solve any or all of the disadvantages of known word breakers and/or ways of building word breakers.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Automatically creating word breakers which segment words into morphemes is described, for example, to improve information retrieval, machine translation or speech systems. In embodiments a cross-lingual phrase table, comprising source language (such as Turkish) phrases and potential translations in a target language (such as English) with associated probabilities, is available. In various examples, blocks of source language phrases from the phrase table are created which have similar target language translations. In various examples, inference using the target language translations in a block enables stem and affix combinations to be found for source language words without the need for input from human judges or advance knowledge of source language linguistic rules or a source language lexicon.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 2 is a schematic diagram of a cross-lingual phrase table;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a word breaker building system using a Turkish-English phrase table (where Turkish is referred to as the source or unknown language and English is referred to as the target or known language), the system described is provided as an example and not a limitation. As those skilled in the art will appreciate, the present examples are suitable for application in a variety of different types of word breaker systems using a variety of different languages.

Figure 1:
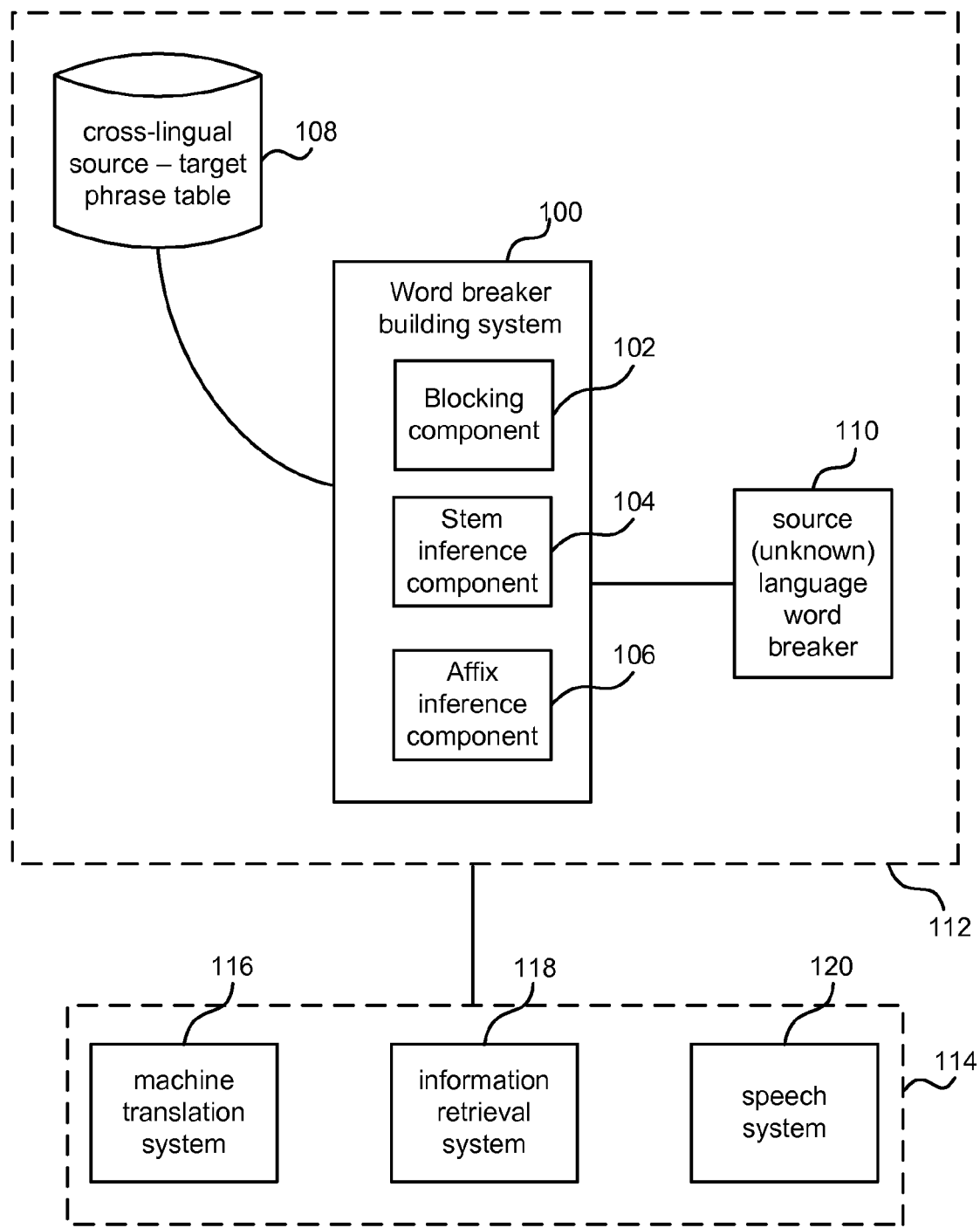
FIG. 1 is a schematic diagram of a word breaker created using a word breaker building system which has access to a cross-lingual phrase table.

FIG. 1 is a schematic diagram of a word breaker 110 created using a word breaker building system 100 which has access to a cross-lingual phrase table 108. The word breaker 110 is created to segment (or break) words of a source language such as Turkish into Turkish morphemes. The word breaker 110 may output more than one possible segmentation for a given word together with a probability value associated with each segmentation. The source language is unknown in that there is no prior knowledge of Turkish available to the word breaker building system 100 except for the cross-lingual phrase table which is explained in more detail below. Apart from access to the cross-lingual phrase table, the work breaker building system has no knowledge of Turkish linguistic rules, no Turkish lexicon, no examples of Turkish words segmented into morphemes by human judges.

The word breaker 110 may comprise a database, memory or other store holding one or more of: a stem lexicon, affix lists, an affix-stem applicability matrix, and segmentation probabilities. The word breaker 110 may also comprise computer-implemented rules, criteria or other processes to receive words in the source language and to use the information in the database, memory or other store to segment the source language words into morphemes. The word breaker 110 may output a plurality of solutions for a given word with probabilities associated with each solution.

A stem lexicon is a list of morphemes which may be identified as nouns, verbs, adjective, adverbs, proper nouns, or function words. In the examples described herein a stem lexicon may be cross-lingual as it may indicate, for a stem in the unknown language (e.g. Turkish) which known (e.g. English) language stem it corresponds to.

An affix list is a list, of suffixes and/or prefixes observed in examples of text in the unknown language. The term "affix" is used here to mean either a prefix or a suffix or both. The affix list may be stored in any form and is not limited to being stored in list form.

An affix-stem applicability matrix is a record of combinations of affixes and stems observed in the unknown language with details of the meanings of those combinations from the known language (e.g. English). For example, the meaning may be that a particular suffix is used to give the present third person form of a verb. The affix-stem applicability matrix may be stored in any form and is not limited to being stored in matrix form.

An affix applicability matrix is a record of combinations of affixes observed to occur together in the unknown language, the affix applicability matrix may be stored in any format and is not limited to being stored in matrix form and can have information about the sequence of affixes when combined together.

A segmentation probability is a numerical value expressing the likelihood that a given word is formed of specified morphemes in a specified order. The numerical value may be expressed as a percentage, as a value between 0 and 1 or in other ways.

The word breaker building system 100 is computer implemented using software and/or hardware. It comprises a blocking component 102 for creating groups of one or more phrases from the phrase table; a stem inference component 104 for inferring stems using the output of the blocking component 102; and an affix inference component 106 for forming affix lists, an affix applicability matrix, and an affix-stem applicability matrix. Output from the word breaker building system comprises stems, affix lists, affix applicability matrix, affix-stem applicability matrix and segmentation probabilities for use at the source language word breaker 110.

The cross-lingual phrase table 108 may be a database, store or other memory holding a mapping from each source phrase to possible target phrases with associated probabilities. A source phrase comprises one or more words in an unknown language such as Turkish for which it is desired to create a word breaker. A target phrase comprises one or more words in a known language such as English. The mapping may be stored in the form of a table or may be stored in any other suitable manner. An example in which a table format is used is discussed in more detail below with reference to FIG. 2.

Together the cross-lingual phrase table, word breaker building system 100 and source word breaker 110 form a system 112 for analyzing words. One or more components of system 112 may be used by downstream systems 114 including but not limited to a machine translation system 116, an information retrieval system 118, and a speech system 120. For example, Turkish words input to the source word breaker 110 may be split into morphemes so that the morphemes may be used by the machine translation system 116 to more effectively translate the Turkish words into words in another language. This is especially useful for highly inflectional languages such as Turkish and Finnish because the need for huge amounts of translated pairs as training data for machine-learning the required models, is reduced. In another example, the morphemes from the source language word breaker 110 may be used to create different forms of query words for use in information retrieval (to expand a search query). In the case of the speech system 120 the morphemes output by the source language word breaker are used as input to a speech system 120 to enable the speech recognition system to more effectively interpret Turkish speech.

Alternatively, or in addition, the functionality of any one or more of the components of FIG. 1 as described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

FIG. 2 shows at least part of a phrase table 200 mapping between Turkish and English. Each row represents mappings between a source phrase and one or more potential target phrases, each mapping having an associated probability value. A column 202 of the table holds source phrases and in this example, it is the leftmost column. Other columns 204, 206, 208 of the table hold potential target phrases and probability values. The example in FIG. 2 has only a few rows for clarity; in practice tens of millions of rows may be present.

Row 210 of the table has a source phrase which is "bir saatlik" which is mapped to potential target phrase "an hourly" with probability 0.6702634, and is also mapped to potential target phrase "a one hour" with probability 0.6348674, and is also mapped to potential target phrase "one hour" with probability 0.6297368.

Row 212 of the table has a source phrase which is "kapay-incaya" which is mapped to potential target phrase "the blink" with probability 0.5299705, and to potential target phrase "blink" with probability 0.5147306; and to potential target phrase "blink of" with probability 0.506618.

The phrase table may have been generated through an automatic process called word alignment that runs on parallel sentences. Parallel sentences are pairs of source sentences in a given language and their translations in another language.

Figure 3:
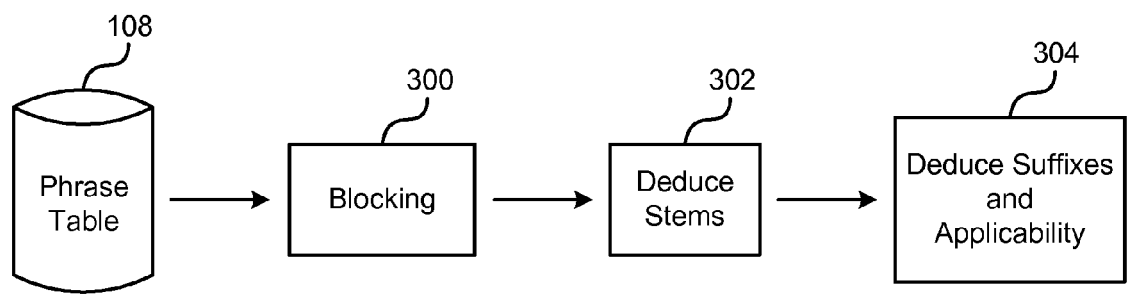
FIG. 3 is a flow diagram of a method of using a cross-lingual phrase table to create a word breaker.

FIG. 3 is a flow diagram of a method of operation at the word breaker building system 100. The method accesses the cross-lingual phrase table 108 and carries out blocking 300. Blocking is a process which groups into blocks, phrases in the source language (unknown) that share similar translations in the target language (known). The method deduces stems, 302. This is achieved by finding stems in the source language (unknown) which are shared by phrases in a block. Various different ways of finding stems which are shared may be used as discussed below with reference to FIG. 4. The stems are identified as nouns or verbs using their translations from the phrase table and knowledge of nouns, verbs, adjectives, adverbs, etc. in the target language (English). Probability information associated with the stems is calculated using probability information from the phrase table. The method deduces suffixes, 304 and their applicability. This is achieved by finding suffixes (or prefixes where the source language uses prefixes, unlike Turkish) which are those parts of the phrases which are not stems in the blocks. The applicability of the suffixes (or prefixes) is found by examining the English language counterparts of the phrases from the phrase table and using knowledge of the applicability of those English language counterparts in the English language.

Figure 4:
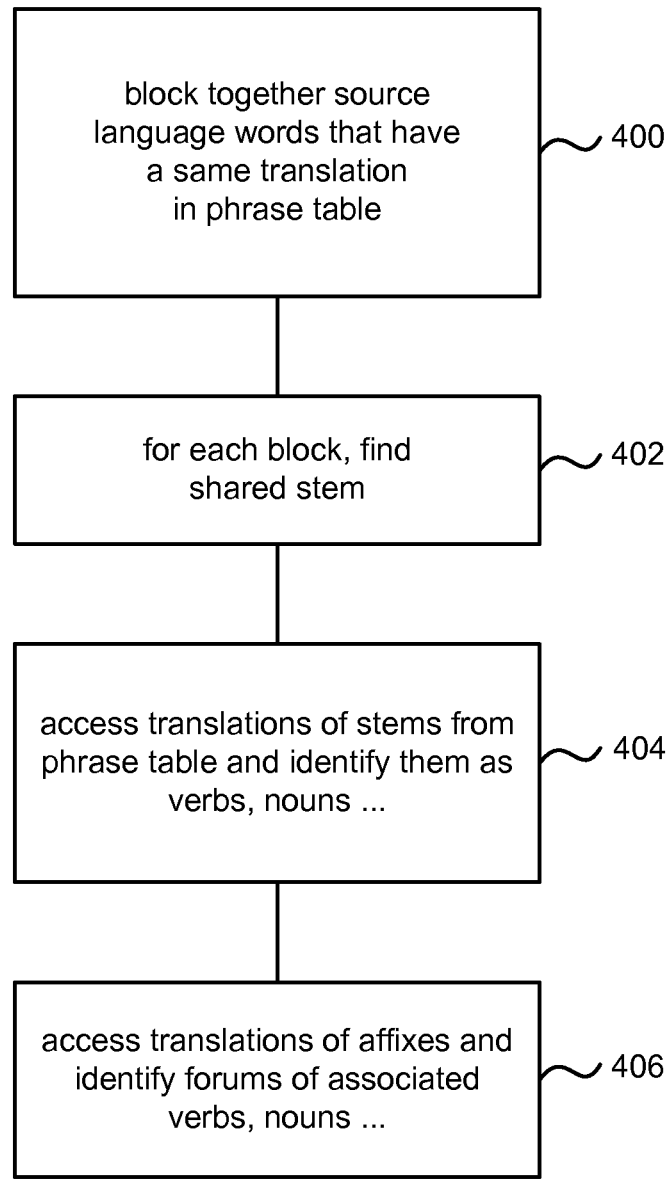
FIG. 4 is a flow diagram of an example of a method of creating a word breaker using the apparatus of FIG. 1.

FIG. 4 is a flow diagram of an example of a method of creating a word breaker using the apparatus of FIG. 1. The method comprises blocking together (400) source language words (unknown) from the phrase table which have a similar (or shared) translation in the target language (known). An example of a block where the translation has a common (shared) word (in this example the word is tree) is now given:

Aacınn|tree shows
Aacındaki|tree

An example of a block where the translation has an inflected word is:

Abartır|exaggerating
Abartmak|exaggerate

An example of a block where the translation has multiple words and a shared meaning is:

Açamadı|could not open
açamazsanız|if you cannot open
For each block a shared stem is found 402. For example,
Açıcı|açıcısı|açıcının
In the above block the shared stem is açıcı
Açığı|açığıdır|açığıyla
In the above block the shared stem is açiği The above examples illustrate different ways in which the blocking component (102 of FIG. 1) may allocate phrases from the phrase table to blocks. A phrase from the phrase table may be a member of more than one block.

The blocking component may operate by selecting a translation from the phrase table, and searching the phrase table for any source language phrases (e.g. Turkish phrases) which have mappings to one or more target language phrases (e.g. English phrases) which are similar to the selected translation. The measure of similarity may take into account letters, words, phrases, semantic meaning, and inflection. The measure of similarity may be a numerical measure based on one or more of these factors and it may be compared to a threshold or other criteria in order to decide whether to block or not. In other examples the process checks for the identity of single words in the translations. If the identity is found then blocking occurs. If no identity is found then a check is made for the identity of inflected words. If the identity is found then blocking occurs. If no identity is found then a check is made for the identity of two or more words in the translations. If the identity is found then blocking occurs. If no identity is found then the process proceeds to select another translation from the phrase table. The process may repeat until all the rows of the phrase table have been considered.

The method of FIG. 4 proceeds, for each block, to find a shared stem. Each block comprises source language phrases (e.g. Turkish phrases) and candidate translations with probabilities for each source language phrase. There is some degree of similarity between candidate translations for the source language phrases in the block. The stem inference process searches the source language phrases (e.g. Turkish phrases) of a given block to find sequences of characters of each phrase which are identical in each source language phrase. One of these sequences is called a stem. In the examples described above the stems are at leading character sequences of the phrases. However, this is not essential. In other languages where prefixes are frequently used, the stems may begin later in the word.

The stem inference component is able to examine the shared translations of a block to identify 404 whether the stem found for that block is used in the source language phrases (Turkish phrases) as a noun or as a verb or as any other part of speech (adverb, adjective, function word etc.). To do this, the stem inference component uses stored knowledge about part-of-speeches, including nouns and verbs, in the target language. The knowledge may be encapsulated in the form of rules which are applied by the stem inference component to the translations to identify use as a noun or use as a verb. The stem inference component stores the resulting stems and their inferred applicability (noun or verb) in an affix-stem applicability matrix.

The process of identifying stems also gives a remainder of a phrase which was not identified as part of the stem. For each block there is a plurality of such remainders, one for each source language phrase in the block. Each remainder is processed to identify an affix, or affix combination. For example, in the following block there are two affixes: "sı" and "nın"

Açıcı|açıcısı|açıcının

The affixes for a given block (and hence a given stem) are stored in an affix list. The affix lists may be stored in an affix-stem applicability matrix.

The translations of the block are used to identify translations of the affixes and to infer 406 the applicability of the affixes using rules encapsulating knowledge of the target language (e.g. English). The applicability of the affixes may be stored in the affix-stem applicability matrix.

For example, if the following mappings are present in a block then the stem inference component may infer that the stem "Abc" means the verb "walk" and the affix "u" gives the present third person of the verb walk, the affix "v" gives the past tense "ed" form of the verb walk, and the affix "y" gives the "ing" form of the verb "walk".

Abc—walk
Abcu—walks
Abcv—walked
Abcy—walking

If the following mappings are present in another block then the stem inference component may infer that the stem "Def" means the verb "play" and the affixes "u" gives the present third person of the verb play, the affix "v" gives the past tense "ed" form of the verb play, and the affix "y" gives the "ing" form of the verb "play".

Def—play
Defu—plays
Defv—played
Defy—playing

In this example the affix list is: u, v, y for both blocks and the affix-stem applicability matrix is able to avoid duplicate storage of the affix lists by storing:

Abc(verb)>>walk
Def(verb)>>play
U>>present third
V>>ed form
Y>>ing form

Which is an example of part of an inferred Turkish lexicon to be used by the source language word breaker 110 of FIG. 1.

Segmentation probabilities may also be stored for use by the source language word breaker 110 of FIG. 1. The blocking component accesses the probability values associated with each translation in the phrase table. These probabilities are aggregated for each translation in a block which is used to deduce the stem inferred from that block. This gives a probability value associated with each stem. The probability values may be stored in the affix-stem applicability matrix. The probability of a segmentation of a given word is computed as the ratio of the occurrences of this specific segmentation among different blocks throughout the phrase table and the total occurrences of the final form word across the phrase table. For example, part of an inferred Turkish lexicon may be Acıkm and iş with probability 75%; or
Acık and miş with probability 25%.

When the word breaker receives the word Acıkmış, it is able to segment that word in two possible ways as indicated above and gives the probabilities for each segmentation. When the word breaker receives the input word, it matches stems from its store of stems to the word and any stems which occur in the word and which have an associated affix (from the affix list for that stem) which also occurs in the word. The word breaker outputs these possible segmentations together with the probabilities associated with these segmentations from the affix-stem applicability matrix. In some cases, the word breaker receives as input phrases or sentences and is able to infer whether a given word is being used as a noun or as a verb, based on the context. In this case the word breaker is able to select the appropriate segmentations based on the identified part-of-speech in context.

Figure 5:
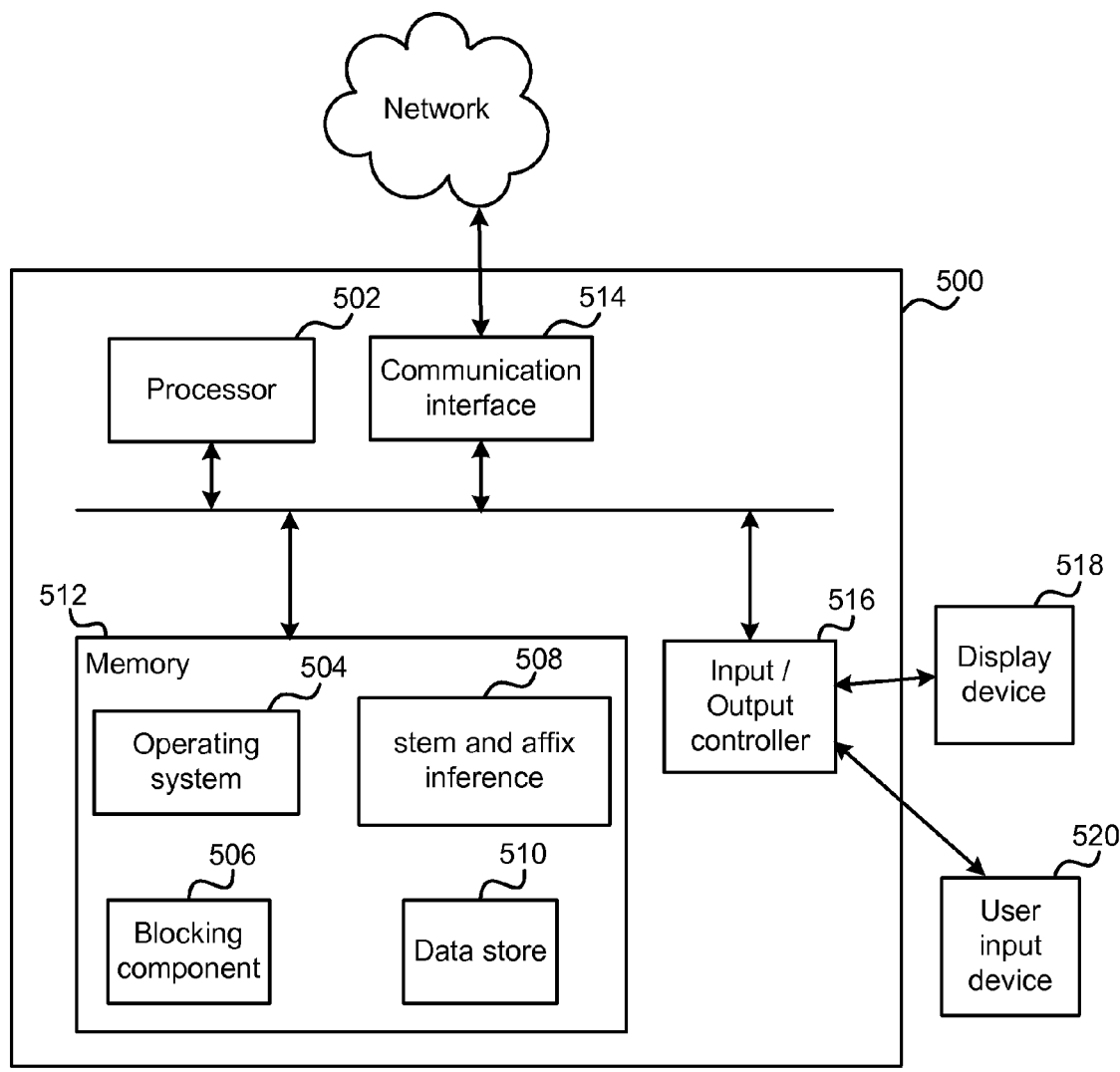
FIG. 5 illustrates an exemplary computing-based device in which embodiments of a word breaker and/or an apparatus for creating a word breaker may be implemented.

FIG. 5 illustrates various components of an exemplary computing-based device 500 which may be implemented as any form of a computing and/or electronic device, and in which embodiments of a word breaker building system and/or a word breaker may be implemented.

Computing-based device 500 comprises one or more processors 502 which may be microprocessors, controllers or any other suitable type of processors for processing computer executable instructions to control the operation of the device in order to create a word breaker for a source (unknown) language automatically from a cross-lingual phrase table, and/or to break words in the source language into morphemes. In some examples, for example where a system on a chip architecture is used, the processors 502 may include one or more fixed function blocks (also referred to as accelerators) which implement a part of the methods of building a word breaker and/or operating a word breaker in hardware (rather than software or firmware). Platform software comprising an operating system 504 or any other suitable platform software may be provided at the computing-based device to enable application software to be executed on the device. A blocking component 506 may be provided in some examples as software stored at memory 512 and/or using hardware. The blocking component 506 is an example of the blocking component of FIG. 1 and is able to carry out the method of box 400 of FIG. 4 for example. A stem and affix inference component 508 may be provided in some examples as software stored at memory 512 and/or using hardware. The stem and affix inference component is an example of the stem inference component and the affix inference component of FIG. 1. The stem and affix inference component is able to carry out the method of boxes 402 to 406 of FIG. 4 in some examples. A data store 510 may store stems, affix lists, affix-stem applicability matrices, segmentation probabilities, rules, thresholds, phrase tables, words, morphemes and other data.

The computer executable instructions may be provided using any computer-readable media that is accessible by computing based device 500. Computer-readable media may include, for example, computer storage media such as memory 512 and communications media. Computer storage media, such as memory 512, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 512) is shown within the computing-based device 500, it will be appreciated that the storage may be distributed or located remotely and accessed via a network or other communication link (e.g. using communication interface 514).

The computing-based device 500 also comprises an input/output controller 516 arranged to output display information to a display device 518 which may be separate from or integral to the computing-based device 500. The display information may provide a graphical user interface. The input/output controller 516 is also arranged to receive and process input from one or more devices, such as a user input device 520 (e.g. a mouse, keyboard, camera, microphone or other sensor). In some examples the user input device 520 may detect voice input, user gestures or other user actions and may provide a natural user interface (NUI). This user input may be used to specify phrase tables to be used, input words to be broken, view the affix-stem applicability matrix, set thresholds, define rules or for other purposes. In an embodiment the display device 518 may also act as the user input device 520 if it is a touch-sensitive display device. The input/output controller 516 may also output data to devices other than the display device, e.g. a locally connected printing device.

Any of the input/output controller 516, display device 518 and the user input device 520 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented process, comprising:
   receiving a parallel corpus of a source language and a target language;
   applying a machine translation training process to the parallel corpus to generate a cross-lingual phrase table comprising a plurality of source language phrases, each source language phrase having at least one target language translation;
   applying a blocking operation to the cross-lingual phrase table to group phrases of the source language into blocks by searching the cross-lingual phrase table to find blocks of two or more source language phrases that share similar translations in the target language;
   searching each of the different source language phrases in each block to identify a stem of a word of the source language, the stem in each block comprising a same sequence of characters occurring in each of the different source language phrases of that block;
   searching each of the different source language phrases in each block to find a plurality of affixes of the stem of that block, each affix in each block comprising a sequence of characters preceding or following the characters comprising the stem in any of the different source language phrases in that block;
   generating a set of morphemes comprising the stems and affixes of words of the source language;
   in response to receipt of a user query in the source language, applying the set of morphemes to automatically create one or more different forms of one or more words of the user query; and
   performing an expanded query search using the automatically created different forms of the words of the user query.

2. The computer-implemented process of claim 1 further comprising applying probability values associated with the target language translations to calculate a probability associated with stems and affixes of the source language.

3. The computer-implemented process of claim 1 wherein the morphemes are provided to a speech recognition system for use in interpreting one or more source language phrases.

4. The computer-implemented process of claim 1 wherein the blocking operation further comprises finding similar target language translations by finding target language translations comprising at least one identical single word.

5. The computer-implemented process of claim 1 wherein the blocking operation further comprises finding similar target language translations by finding target language translations comprising the same target language word in any of a plurality of inflected forms.

6. The computer-implemented process of claim 1 wherein the blocking operation further comprises finding similar target language translations by finding target language translations comprising two or more shared target language words.

7. The computer-implemented process of claim 1 further comprising inferring whether the stem is a noun or a verb by using the target language phrases.

8. The computer-implemented process of claim 1 further comprising inferring applicability of the affixes by using the target language phrases.

9. The computer-implemented process of claim 1 further comprising receiving a source language word to be segmented into morphemes and finding at least one combination of the stems and affixes which match the word.

10. The computer-implemented process of claim 9 further comprising outputting a probability value associated with the at least one combination of the stems and affixes.

11. A system, comprising:
   a general purpose computing device; and
   a computer program comprising program modules executable by the computing device, wherein the computing device is directed by the program modules of the computer program to:
   receive a cross-lingual phrase table comprising a plurality of source language phrases, each source language phrase having at least one target language translation;

searching the cross-lingual phrase table to find blocks of two or more source language phrases which have similar target language translations;

apply the cross-lingual phrase table and blocks to infer and store, for source language words from the cross-lingual phrase table, a set of morphemes comprising stems and affixes of the words, the inference comprising:

搜searching each of the different source language phrases in each block to identify a stem of a word of the source language, the stem in each block comprising a same sequence of characters occurring in each of the different source language phrases of that block, and searching each of the different source language phrases in each block to find a plurality of affixes of the stem of that block, each affix in each block comprising a sequence of characters preceding or following the sequence of characters comprising the stem in any of the different source language phrases in that block;

in response to receipt of a user query in the source language, apply the set of morphemes to automatically create one or more different forms of one or more words of the user query; and perform an expanded query search using the automatically created different forms of the words of the user query.

12. The system of 11 further comprising applying probability values associated with the target language translations to calculate a probability associated with a stem and an affix.

13. A computer-readable memory having computer executable instructions stored therein, said instructions causing a computing device to execute a method comprising:

accessing a cross-lingual phrase table comprising a plurality of source language phrases, each source language phrase having at least one target language translation;

searching the cross-lingual phrase table to find blocks of two or more source language phrases which have similar target language translations;

applying the cross-lingual phrase table and blocks to infer and store, for source language words from the cross-lingual phrase table, a set of morphemes comprising stems and affixes of the words, the inference comprising:

searching each of the different source language phrases in each block to identify a stem of a word of the source language, the stem in each block comprising a same sequence of characters occurring in each of the different source language phrases of that block, and searching each of the different source language phrases in each block to find a plurality of affixes of the stem of that block, each affix in each block comprising a sequence of characters preceding or following the sequence of characters comprising the stem in any of the different source language phrases in that block;

in response to receipt of a user query in the source language, applying the set of morphemes to automatically create one or more different forms of one or more words of the user query; and performing an expanded query search using the automatically created different forms of the words of the user query.

14. The computer-readable memory of claim 13 further comprising providing the set of morphemes to a speech recognition system for use in interpreting one or more source language phrases.

* * * * *